(12) United States Patent
Yang

(10) Patent No.: US 9,039,553 B2
(45) Date of Patent: May 26, 2015

(54) TREADLE-DRIVE ECCENTRIC WHEEL TRANSMISSION WHEEL SERIES WITH PERIODICALLY VARIED SPEED RATIO

(76) Inventor: Tai-Her Yang, Dzan-Hwa (TW)

( * ) Notice: Subject to any disclaimer, the term of this patent is extended or adjusted under 35 U.S.C. 154(b) by 181 days.

(21) Appl. No.: 13/435,272

(22) Filed: Mar. 30, 2012

(65) Prior Publication Data

US 2012/0252622 A1    Oct. 4, 2012

Related U.S. Application Data

(63) Continuation-in-part of application No. 13/076,560, filed on Mar. 31, 2011, now abandoned, and a continuation-in-part of application No. 13/076,569, filed on Mar. 31, 2011, now abandoned, and a continuation-in-part of application No. 13/087,450, filed on Apr. 15, 2011, and a continuation-in-part of application No. 13/087,453, filed on Apr. 15, 2011.

(51) Int. Cl.
| | |
|---|---|
| F16H 55/30 | (2006.01) |
| F16H 55/36 | (2006.01) |
| B62M 9/08 | (2006.01) |
| F16H 7/02 | (2006.01) |
| F16H 35/00 | (2006.01) |

(52) U.S. Cl.
CPC .............. B62M 9/085 (2013.01); *F16H 7/02* (2013.01); *F16H 2035/001* (2013.01); *F16H 2035/003* (2013.01)

(58) Field of Classification Search
CPC ..... F16H 9/04; F16H 35/02; F16H 2035/003; F16H 7/08; B62M 9/08; B62M 9/085; B62M 2009/002

USPC ...................................................... 474/71, 141
See application file for complete search history.

(56) References Cited

U.S. PATENT DOCUMENTS

| | | | | |
|---|---|---|---|---|
| 528,145 | A * | 10/1894 | Carr | 474/84 |
| 528,956 | A * | 11/1894 | Lippy et al. | 280/238 |
| 529,267 | A * | 11/1894 | Homan | 474/141 |
| 591,488 | A * | 10/1897 | McMullin | 474/81 |
| 596,289 | A * | 12/1897 | Smith | 474/141 |
| 599,211 | A * | 2/1898 | Williams | 474/141 |
| 611,170 | A * | 9/1898 | Savory | 474/134 |
| 613,756 | A * | 11/1898 | Buddle | 474/141 |
| 618,094 | A * | 1/1899 | Hess | 74/413 |
| 885,982 | A * | 4/1908 | Delacroix | 474/136 |
| 2,155,108 | A * | 4/1939 | Ware | 74/25 |
| 2,277,458 | A * | 3/1942 | Schultze | 474/134 |
| 2,876,616 | A * | 3/1959 | Austin, Jr. et al. | 57/91 |
| 2,294,216 | A * | 8/1961 | Morton | 68/140 |
| 3,259,398 | A * | 7/1966 | Hattan | 280/236 |
| 3,375,022 | A * | 3/1968 | Hattan | 280/238 |
| 3,396,988 | A * | 8/1968 | Kroening | 280/93.502 |
| 3,819,002 | A * | 6/1974 | Heathwaite et al. | 180/227 |
| 3,831,978 | A * | 8/1974 | Dunder et al. | 280/238 |

(Continued)

*Primary Examiner* — Henry Liu
(74) *Attorney, Agent, or Firm* — Bacon & Thomas, PLLC

(57) ABSTRACT

The present invention is structured by using one or both of an active wheel and a passive wheel being composed of an eccentric transmission wheel and being combined with a synchronous transmission belt for forming an eccentric wheel transmission wheel series, so that in the reciprocal treadle performed by the human's feet, when the feet input forces at different angles from the treadle shafts of the treadles to an active wheel shaft combined on the active wheel through cranks, the active wheel forms different transmission speed ratios relative to the passive wheel according to the treadle angle.

7 Claims, 6 Drawing Sheets

(56) References Cited

U.S. PATENT DOCUMENTS

| | | | |
|---|---|---|---|
| 3,870,134 A * | 3/1975 | Anthamatten | 192/217.5 |
| 3,899,932 A * | 8/1975 | Durham | 474/141 |
| 4,103,563 A * | 8/1978 | Genzling | 74/594.5 |
| 4,159,652 A * | 7/1979 | Trammell, Jr. | 74/117 |
| 4,173,154 A * | 11/1979 | Sawmiller et al. | 474/88 |
| 4,181,034 A * | 1/1980 | Daniel | 474/141 |
| 4,193,324 A * | 3/1980 | Marc | 475/349 |
| 4,218,931 A * | 8/1980 | Tritenne | 474/165 |
| 4,501,576 A * | 2/1985 | Tanaka et al. | 474/141 |
| 4,522,610 A * | 6/1985 | Nagano | 474/141 |
| 4,816,009 A * | 3/1989 | Philipp | 474/69 |
| 4,850,939 A * | 7/1989 | Chilcote et al. | 474/49 |
| 4,865,577 A * | 9/1989 | Freudenstein | 474/141 |
| 4,976,348 A * | 12/1990 | Berry | 192/217.4 |
| 5,067,370 A * | 11/1991 | Lemmens | 74/594.2 |
| 5,882,025 A * | 3/1999 | Runnels | 280/259 |
| 5,899,477 A * | 5/1999 | Vergara | 280/261 |
| 6,293,884 B1 * | 9/2001 | Chattin | 474/160 |
| 6,371,874 B1 * | 4/2002 | Inoue | 474/156 |
| 6,840,136 B1 * | 1/2005 | Jones | 74/594.2 |
| 7,128,672 B2 * | 10/2006 | Chattin | 474/141 |
| 2007/0173361 A1 * | 7/2007 | Schuseil | 474/87 |
| 2007/0246908 A1 * | 10/2007 | Shu | 280/261 |
| 2009/0036244 A1 * | 2/2009 | Gravio | 474/156 |

* cited by examiner

TREADLE-DRIVE ECCENTRIC WHEEL TRANSMISSION WHEEL SERIES WITH PERIODICALLY VARIED SPEED RATIO

CROSS-REFERENCE TO RELATED APPLICATION

This application is a Continuation-In-Part of application Ser. Nos. 13/087,450 and 13/087,453, filed on Apr. 15, 2011, which are a Continuation-In-Part of application Ser. Nos. 13/076,560 and 13/076,569, filed on Mar. 31, 2011.

BACKGROUND OF THE INVENTION (a) Field of the Invention

The present invention relates to a driving wheel series in which reciprocal treadle performed by human's two feet is transformed into rotation motions, especially one or both of an active wheel and a passive wheel is composed of an eccentric transmission wheel and combined with a synchronous transmission belt for forming an eccentric wheel transmission wheel series, so that in the reciprocal treadle performed by the rider's feet, through the certain structure of treadle-drive eccentric wheel transmission wheel series with periodically varied speed ratio to incorporate with the certain relation with respect to the treadling angle, the active wheel generates two speed ratio variations to the passive wheel in each rotation period, thereby by incorporating with the reciprocal treadle performed by two feet, when the feet input forces at different angles from the treadle shafts of the treadles to an active wheel shaft combined on the active wheel through cranks, the active wheel forms different transmission speed ratios relative to the passive wheel.

(b) Description of the Prior Art

A conventional treadle-drive transmission wheel series in which reciprocal treadle are performed by human's two feet is often utilized in an appliance wherein the reciprocal treadle performed by two feet is adopted for generating the rotation driving, such as a human treadling driven bicycle, a movement-assisting bicycle with human treadling drive and an electric motor for assistance, a fixed bicycle for exercising, a treadle-drive boat, a treadle-drive rotation type power generator, or a treadle-drive rotation fluid pump; in a treadle-drive transmission wheel series, chain wheels incorporate with chains, belt pulleys incorporate with belts, timing belt pulleys incorporate with timing belts, gears incorporate with tooth-shaped chains or gear transmission sets, so two feet can treadle a round active wheel for linking a passive wheel for driving a load; in the treadling, the feet can apply the most efficient treadling force to the active wheel with a certain angle displacement range, but the reciprocal treadle performed by human's feet and the rotation motion of the active wheel form a relation of simple harmonic motion, and due to the relation of simple harmonic motion, inefficient or low-efficient angle displacement ranges still exist and shall be improved.

SUMMARY OF THE INVENTION

The present invention provides a treadle-drive eccentric wheel transmission wheel series with periodically varied speed ratio, which is a novel transmission wheel series utilizing the reciprocal treadle performed by human's two feet to transform into rotation motions, wherein one or both of an active wheel and a passive wheel is composed of an eccentric transmission wheel and combined with a synchronous transmission belt for forming an eccentric wheel transmission wheel series, so that in the reciprocal treadle performed by the human's feet, when the feet input forces at different angles from the treadle shafts of the treadles to an active wheel shaft combined on the active wheel through cranks, the active wheel forms different transmission speed ratios relative to the passive wheel according to the treadle angle.

DESCRIPTION OF MAIN COMPONENT SYMBOLS

Figure 1:
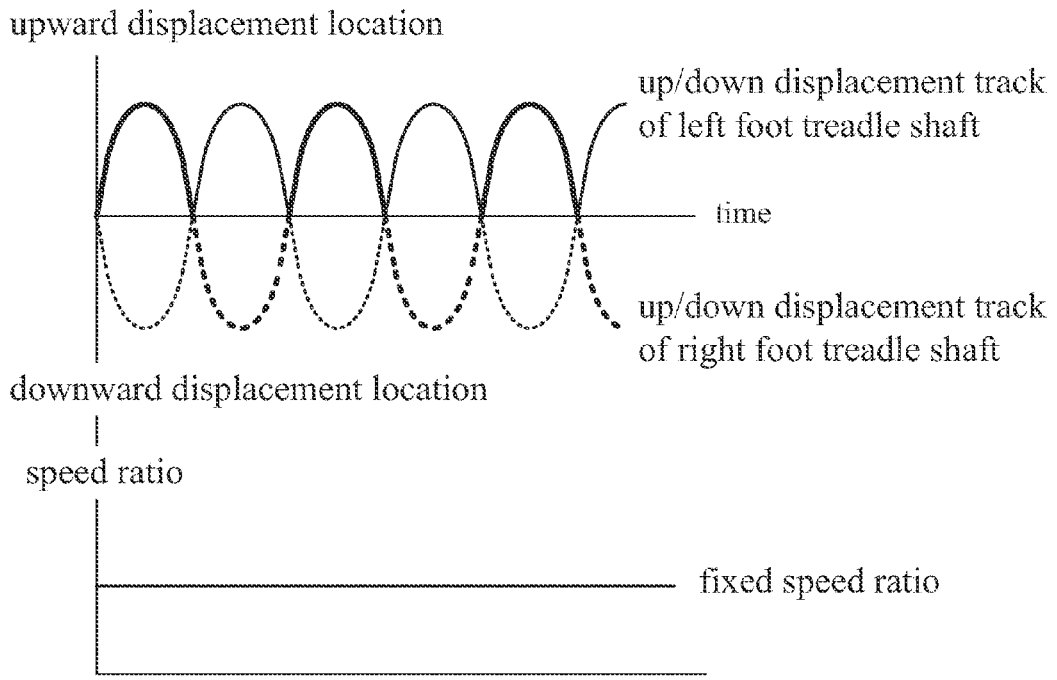
FIG. 1 is a schematic view showing the speed ratio relation of the passive wheel and a mechanical driving angle formed through the active wheel shaft and the treadle shafts for treadling by two feet, according to a conventional round transmission wheel series.

100: Transmission belt
101: First crank
102: First treadle
103: First treadle shaft
111: Active wheel shaft
112: Bimodal elliptical active wheel
113: Round active wheel
114: Bimodal elliptical active gear
201: Second crank
202: Second treadle
203: Second treadle shaft
211: Passive wheel shaft
213: Bimodal elliptical passive wheel
214: Bimodal elliptical passive gear
301: Auxiliary wheel press helve
302: Auxiliary wheel prestressed spring
303: Auxiliary wheel press helve swing shaft
311: Auxiliary wheel shaft
312: Auxiliary wheel
413: Eccentric passive wheel
600: Load wheel set
601: Sleeve
602: Core axis
800: Machine body
1000: Eccentric transmission wheel series
2000: Inner variable speed device
3000: Outer variable speed device
5000: Middle transmission
a: Upper stop directivity of b
b: Driving mechanical angle directivity of the first treadle shaft (103) or the second treadle shaft (203) to the active wheel shaft (111)
c: Eccentric upper protrusion directivity of eccentric passive wheel (413)

DETAILED DESCRIPTION OF THE PREFERRED EMBODIMENTS

A conventional treadle-drive transmission wheel series in which reciprocal treadle are performed by human's two feet is often utilized in an appliance wherein the reciprocal treadle performed by two feet is adopted for generating the rotation driving, such as a human treadling driven bicycle, a movement-assisting bicycle with human treadling drive and an electric motor for assistance, a fixed bicycle for exercising, a treadle-drive boat, a treadle-drive rotation type power generator, or a treadle-drive rotation fluid pump; in a treadle-drive transmission wheel series, chain wheels incorporate with chains, belt pulleys incorporate with belts, timing belt pulleys incorporate with timing belts, gears incorporate with tooth-shaped chains or gear transmission sets, so two feet can treadle a round active wheel for linking a passive wheel for driving a load; in the treadling, the feet can apply the most efficient treadling force to the active wheel with a certain angle displacement range, but the reciprocal treadle performed by human's feet and the rotation motion of the active wheel form a relation of simple harmonic motion, and due to the relation of simple harmonic motion, inefficient or low-efficient angle displacement ranges still exist and shall be improved.

The present invention provides a treadle-drive eccentric wheel transmission wheel series with periodically varied speed ratio, which is a novel transmission wheel series utilizing the reciprocal treadle performed by human's two feet to transform into rotation motions, wherein one or both of an active wheel and a passive wheel is composed of an eccentric transmission wheel and combined with a synchronous transmission belt for forming an eccentric wheel transmission wheel series, so that in the reciprocal treadle performed by the human's feet, when the feet input forces at different angles from the treadle shafts of the treadles to an active wheel shaft combined on the active wheel through cranks, the active wheel forms different transmission speed ratios relative to the passive wheel according to the treadle angle.

In the treadle-drive eccentric wheel transmission wheel series with periodically varied speed ratio of the present invention, the active wheels or the passive wheels to constitute the eccentric wheel series include the round eccentric wheel, non-round eccentric wheel, bimodal elliptical wheel and round wheel to constitute both or one of the active wheels and the passive wheels, so as to incorporate with timing pulleys and transmission belt, or chain wheels and the transmission chain, or directly constituted by the gear set with the function of periodically varied speed ratio;

The present invention relates to a driving wheel series in which reciprocal treadle performed by human's two feet is transformed into rotation motions, especially one or both of an active wheel and a passive wheel is composed of an eccentric transmission wheel and combined with a synchronous transmission belt for forming an eccentric wheel transmission wheel series, so that in the reciprocal treadle performed by the rider's feet, through the certain structure of treadle-drive eccentric wheel transmission wheel series with periodically varied speed ratio to incorporate with the certain relation with respect to the treadling angle, the active wheel generates two speed ratio variations to the passive wheel in each rotation period, thereby by incorporating with the reciprocal treadle performed by two feet, when the feet input forces at different angles from the treadle shafts of the treadles to an active wheel shaft combined on the active wheel through cranks, the active wheel forms different transmission speed ratios relative to the passive wheel.

According to the treadle-drive eccentric wheel transmission wheel series with periodically varied speed ratio of the present invention, the transmission speed ratio can achieve the maximum while close to the maximum treadling force angle, and the maximum transmission speed ratio is defined as the rotation speed angle displacement of the active wheel being capable of relatively transmitting a higher rotation speed to the passive wheel compared to other angle displacements during the whole period of the active wheel performing transmission to the passive wheel, the illustration is as following:

FIG. 1 is a schematic view showing the speed ratio relation of the passive wheel and a mechanical driving angle formed through the active wheel shaft and the treadle shafts for treadling by two feet, according to a conventional round transmission wheel series.

As shown in FIG. 1, when a rider uses his two feet to treadle for riding a bicycle, the treadle shafts respectively driven by the left foot and the right foot form a sine wave treadle track with 180 degree differentiation, wherein the right foot treadles with respect to the up/down displacement track of the right foot treadle shaft, and the left foot treadles with respect to the up/down displacement track of the left foot treadle shaft, and during the continuous treadling of the right foot and the left foot, the speed ratio of the active wheel and the passive wheel of the treadle-driven round transmission wheel series is the same.

Figure 2:
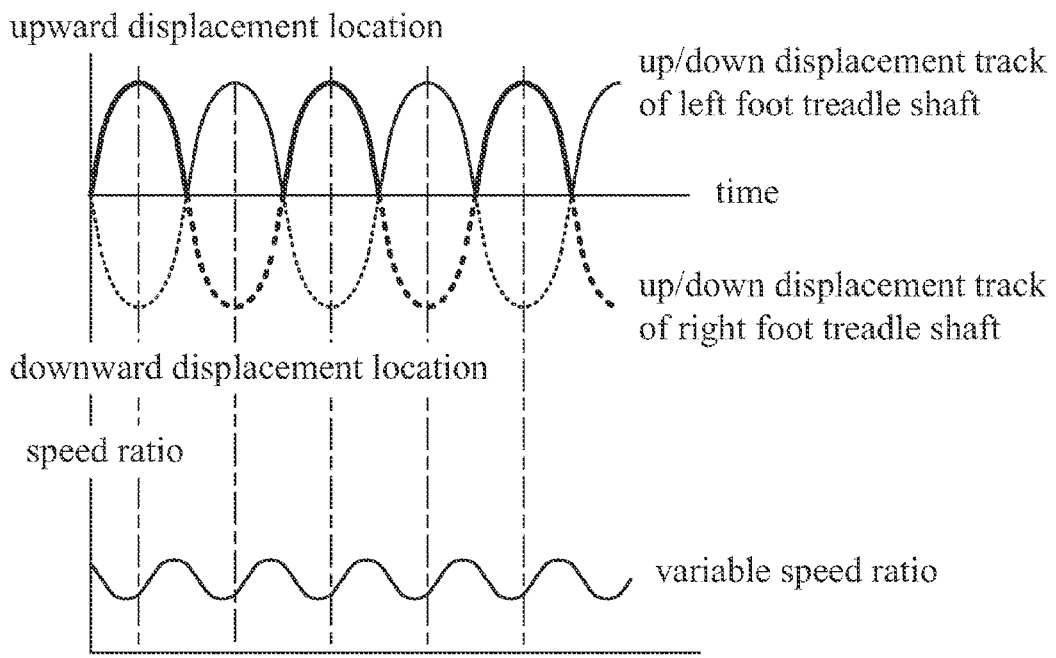
FIG. 2 is a schematic view showing the speed ratio relation of the passive wheel and a mechanical driving angle formed through the active wheel and the treadle shafts of the two feet treadles, according to the eccentric transmission wheel series (1000) of the present invention.

FIG. 2 is a schematic view showing the speed ratio relation of the passive wheel and a mechanical driving angle formed through the active wheel and the treadle shafts of the two feet treadles, according to the eccentric transmission wheel series (1000) of the present invention.

Figure 3:
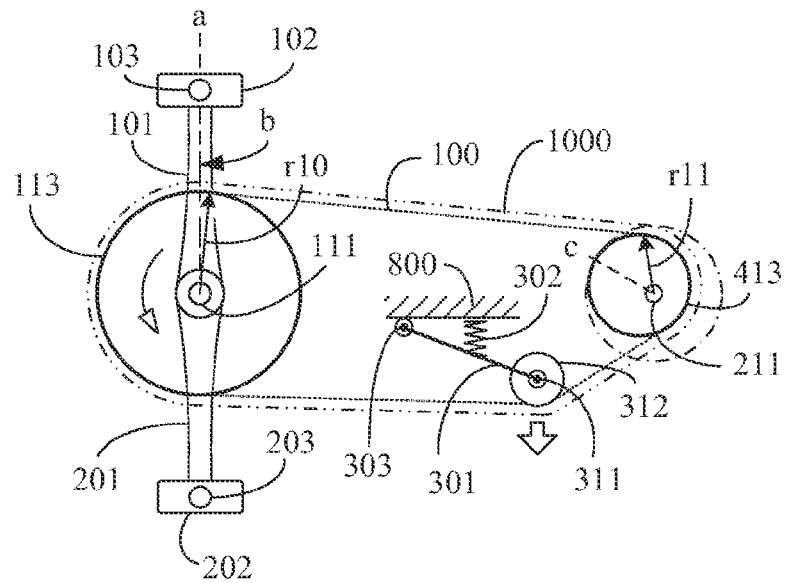
FIG. 3 is a first schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at the position of upper stop directivity (a), wherein the active wheel is composed of the round active wheel (113) and the passive wheel is composed of the eccentric passive wheel (413), according to the eccentric transmission wheel series (1000) of the present invention.

As shown in FIG. 2, when a rider uses his two feet to treadle for riding a bicycle, the treadle shafts respectively driven by the left foot and the right foot form a sine wave shaped treadle track with 180 degree differentiation, wherein the right foot treadles with respect to the up/down displacement track of the first treadle shaft (103), and the left foot treadles with respect to the up/down displacement track of the second treadle shaft (203), during the continuous treadling of the right foot and the left foot, the speed ratio of the active wheel and the passive wheel of the treadle-drive eccentric transmission wheel series (1000) is defined through the mechanical angle differentiation relation of the mechanical angle position between a round active wheel (113) and an active wheel shaft (111), and the mechanical angle position between a first treadle shaft (103) and a second treadle shaft (203) and the active wheel shaft (111), thereby the round active wheel (113) periodically generates twice increase and decrease of the speed ratio to the eccentric passive wheel (413) during each treadle rotation;

FIG. 3 is a first schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at the position of upper stop directivity (a), wherein the active wheel is composed of the round active wheel (113) and the passive wheel is composed of the eccentric passive wheel (413), according to the eccentric wheel transmission wheel series of the present invention.

As shown in FIG. 3, the main constitutions of the eccentric transmission wheel series (1000) are as follow:

Transmission belt (100): a non-slidable belt-shaped structure selected with respect to the wheel-shaped structures of the round active wheel (113) and the eccentric passive wheel (413) and an auxiliary wheel (312), which includes a chain, timing tooth-shaped belt or tooth-shaped belt, so as to be provided for the transmission operation between the round active wheel (113) and the eccentric passive wheel (413) and the auxiliary wheel (312);

Round active wheel (113): combined with the active wheel shaft (111), and the two sides of the active wheel shaft (111) are respectively combined with a first crank (101) and a second crank (201), wherein the first crank (101) is installed with a first treadle shaft (103) for being provided with a first treadle (102), and the second crank (201) is installed with a second treadle shaft (203) for being provided with a second treadle (202), and the round active wheel (113) is composed of a non-slidable chain wheel or timing tooth-shaped pulley or gear.

Eccentric passive wheel (413): composed of the same chain wheel, timing tooth-shaped pulley or gear of which the round active wheel (113) is composed, and installed on the passive wheel shaft (211), and the pitch diameter thereof is half of that of the round active wheel (113), and driven by the round active wheel (113) through the transmission belt (100) which incorporates with the mentioned round active wheel (113) and the eccentric passive wheel (413) and the auxiliary wheel (312), and provided for performing prestressed tightening to the periodical tightening/releasing alternation of the driven transmission belt through the auxiliary wheel (312), and the mechanical angle position of the eccentric upper protrusion directivity (c) of the eccentric passive wheel (413), and the mechanical angle position between the directivity (b) constituted by the first treadle shaft (103) and the second treadle shaft (203) and the active wheel shaft (111) through the transmission belt (100) form a certain mechanical angle differentiation relation;

The eccentric transmission wheel series (1000) of one or more than one step different speed ratio is constituted through the transmission engagement between the transmission belt (100), one or more than one round active wheel (113) and one or more than one eccentric passive wheel (413), as well as through the operation of the speed variable device;

Auxiliary wheel press helve (301): having one end coupled to a machine body (800) for swing motion through an auxiliary wheel press helve swing shaft (303), and the other end being installed with an auxiliary wheel shaft (311) for installing an auxiliary wheel (312), and an auxiliary wheel prestressed spring (302) is installed between the auxiliary wheel press helve (301) and the machine body (800) for generating an outward-expanding or inward-pressing prestressed pressure to the auxiliary wheel (312);

Auxiliary wheel (312): composed of the same chain wheel or timing tooth-shaped pulley or gear of which the round active wheel (113) and the eccentric passive wheel (413) are composed, and provided for rotating on the auxiliary wheel shaft (311) and driven by the transmission belt (100), thereby through linked with the transmission belt (100) incorporating with the round active wheel (113) and the eccentric passive wheel (413), such as a chain or timing tooth-shape pulley or tooth-shaped chain, to utilize the prestressed pressure applied to the auxiliary wheel press helve (301) from the auxiliary wheel prestressed spring (302) to compel the auxiliary wheel shaft (311) and the auxiliary wheel (312), so as to tighten the transmission belt (100);

In the transmission wheel series composed of the round active wheel (113) serving as an active wheel, the eccentric passive wheel (413) serving as a passive wheel and the installation of the auxiliary wheel (312), when a human uprightly treadle to ride a bicycle, the right foot and the left foot follow a simple harmonic motion to form a sine wave treadle track with 180 degree differentiation, wherein the right foot treadles with respect to the up/down displacement track of the first treadle shaft (103), and the left foot treadles with respect to the up/down displacement track of the second treadle shaft (203), and during the continuous treadling of the right foot and the left foot, the speed ratio of the active wheel and the passive wheel of the treadle-drive eccentric transmission wheel series (1000) is defined through the relation of the mechanical angle position of the eccentric upper protrusion directivity (c) of the eccentric passive wheel (413), and through the transmission belt (100) the mechanical angle position of the directivity (b) formed by the first treadle shaft (103) and the second treadle shaft (203) and the active wheel shaft (111), so the round active wheel (113) periodically generates twice increase and decrease of the speed ratio to the eccentric passive wheel (413) during each treadle rotation; for example, the mechanical angle differentiation relation of the mentioned round active wheel (113) and the first treadle shaft (103) and the second treadle shaft (203) is selected to be set as, when treadling along the treadle direction, the mechanical angle directivity (b) of the first treadle shaft (103) or the second treadle shaft (203) to the active wheel shaft (111) passing the upper stop directivity (a) and keeping to treadle along the treadle direction within a 180 degree range, thereby the round active wheel (113) to the eccentric passive wheel (413) is in a transmission varied speed ratio status of tending to the maximum speed accelerating ratio or the minimum speed decelerating ratio; the periodically varied speed ratio relation is upon the wheel shape of the eccentric transmission wheel series (1000), one of the periodically varied speed ratio relation is shown in FIG. 2.

Figure 4:
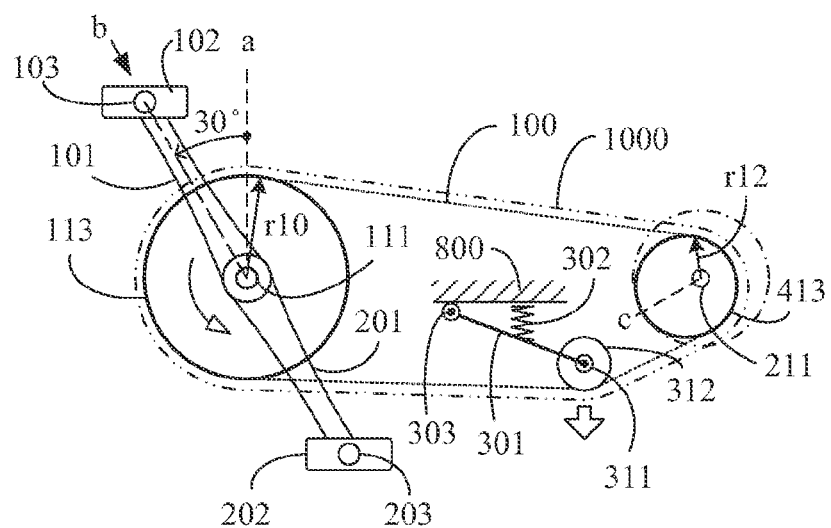
FIG. 4 is a second schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 30 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

As shown in FIG. 3, when the mechanical driving angle directivity (b) of the first treadle shaft (103) to the active wheel shaft (111) is at the position of the upper stop directivity (a), the round active wheel (113) drives the transmission belt (100) with a radius of $r_{10}$ so as to link the eccentric passive wheel (413) having a $r_{11}$ radius, thus a transmission speed ratio of $r_{10}:r_{11}$ is formed;

FIG. 4 is a second schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 30 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

Figure 5:
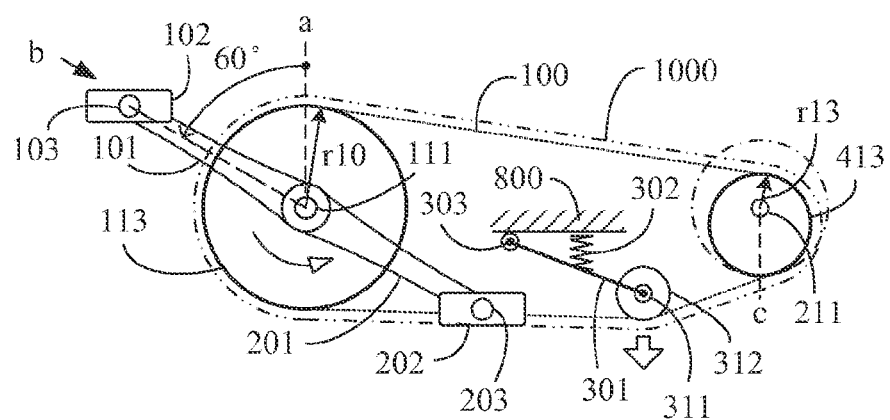
FIG. 5 is a third schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 60 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

As shown in FIG. 4, when the mechanical driving angle directivity (b) of the first treadle shaft (103) to the active wheel shaft (111) is displaced by 30 degree along the rotation direction relative to the upper stop directivity (a), the round active wheel (113) drives the transmission belt (100) with a radius of $r_{10}$ so as to link the eccentric passive wheel (413) having a $r_{12}$ radius, thus a transmission speed ratio of $r_{10}:r_{12}$ is formed;

FIG. 5 is a third schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 60 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

Figure 6:
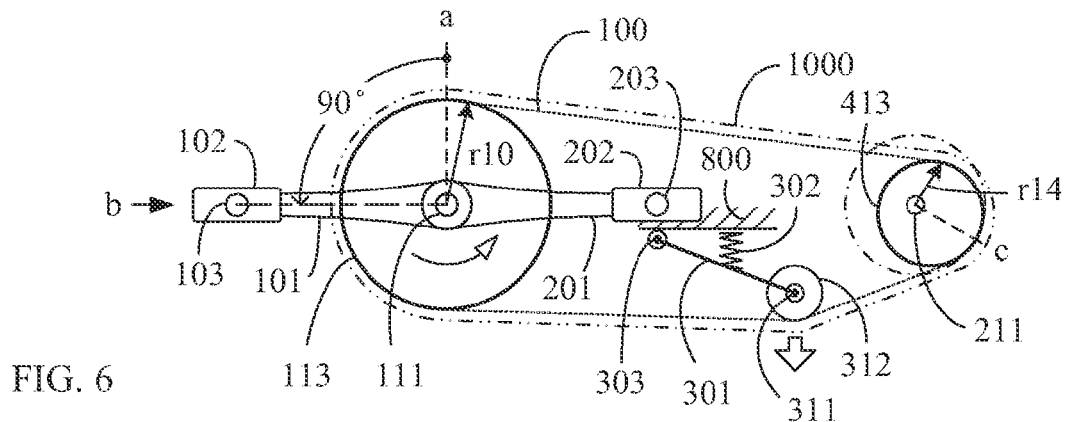
FIG. 6 is a fourth schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 90 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

As shown in FIG. 5, when the mechanical driving angle directivity (b) of the first treadle shaft (103) to the active wheel shaft (111) is displaced by 60 degree along the rotation direction relative to the upper stop directivity (a), the round active wheel (113) drives the transmission belt (100) with a radius of $r_{10}$ so as to link the eccentric passive wheel (413) having a $r_{13}$ radius, thus a transmission speed ratio of $r_{10}:r_{13}$ is formed;

FIG. 6 is a fourth schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 90 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

Figure 7:
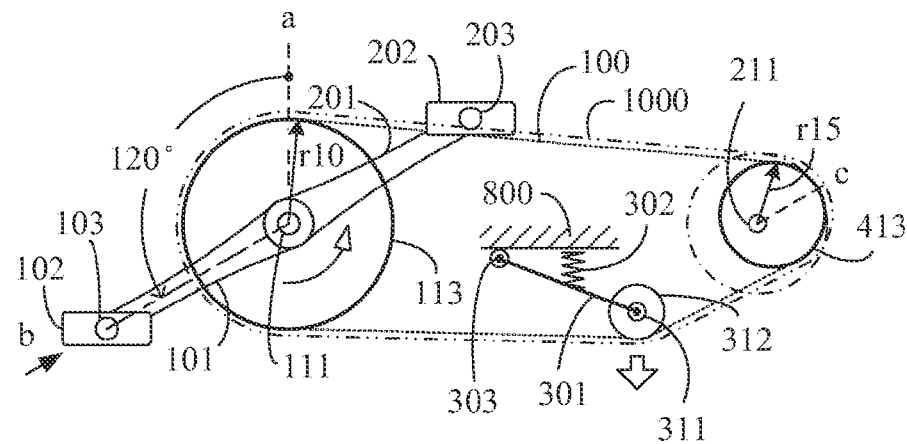
FIG. 7 is a fifth schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 120 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

As shown in FIG. 6, when the mechanical driving angle directivity (b) of the first treadle shaft (103) to the active wheel shaft (111) is displaced by 90 degree along the rotation direction relative to the upper stop directivity (a), the round active wheel (113) drives the transmission belt (100) with a radius of $r_{10}$ so as to link the eccentric passive wheel (413) having a $r_{14}$ radius, thus a transmission speed ratio of $r_{10}:r_{14}$ is formed;

FIG. 7 is a fifth schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 120 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

Figure 8:
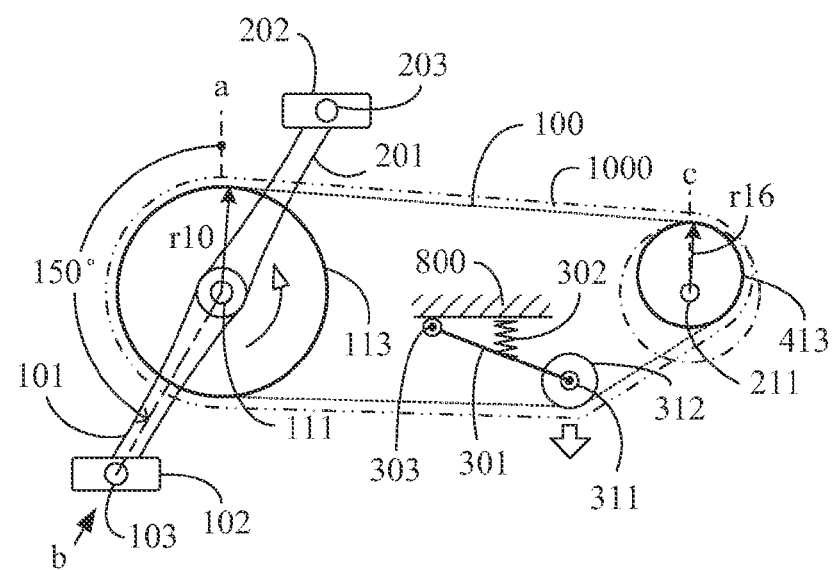
FIG. 8 is a sixth schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 150 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

As shown in FIG. 7, when the mechanical driving angle directivity (b) of the first treadle shaft (103) to the active wheel shaft (111) is displaced by 120 degree along the rotation direction relative to the upper stop directivity (a), the round active wheel (113) drives the transmission belt (100) with a radius of $r_{10}$ so as to link the eccentric passive wheel (413) having a $r_{15}$ radius, thus a transmission speed ratio of $r_{10}:r_{15}$ is formed;

FIG. 8 is a sixth schematic view showing the transmission speed ratio of the round active wheel (113) and the eccentric passive wheel (413) when the mechanical driving angle directivity (b) of the first treadle shaft (103) or the second treadle shaft (203) to the active wheel shaft (111) is at a location defined by displacing 150 degree along the rotation direction relative to the upper stop directivity (a), wherein the active wheel is composed of the round active wheel (113) and the passive wheel is composed of the eccentric passive wheel (413), according to the eccentric transmission wheel series (1000) shown in FIG. 3.

As shown in FIG. 8, when the mechanical driving angle directivity (b) of the first treadle shaft (103) to the active wheel shaft (111) is displaced by 150 degree along the rotation direction relative to the upper stop directivity (a), the round active wheel (113) drives the transmission belt (100) with a radius of $r_{10}$ so as to link the eccentric passive wheel (413) having a $r_{16}$ radius, thus a transmission speed ratio of $r_{10}:r_{16}$ is formed.

The operations of the second treadle shaft (203) driving the active wheel shaft (111), and further through the round active wheel (113) and the transmission belt (100) linking with the eccentric passive wheel (413) and the passive wheel shaft (211) are the same as the mentioned operations of the first treadle shaft (103) driving the active wheel shaft (111), and further through the round active wheel (113) and the transmission belt (100) linking with the eccentric passive wheel (413) and the passive wheel shaft (211).

Figure 9:
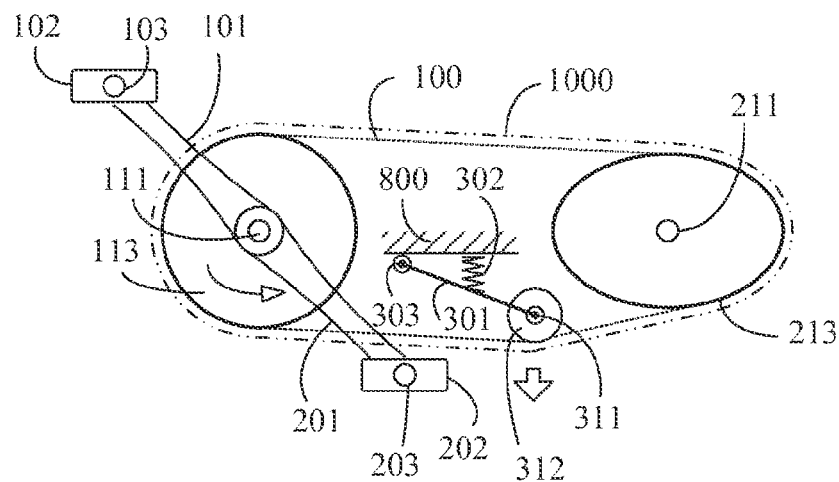
FIG. 9 is a schematic structural view showing the eccentric transmission wheel series (1000) of the present invention wherein the active wheel is a round wheel and the passive wheel is a bimodal elliptical passive wheel.

FIG. 9 is a schematic structural view showing the eccentric transmission wheel series (1000) of the present invention wherein the active wheel is a round wheel and the passive wheel is a bimodal elliptical passive wheel;

As shown in FIG. 9, the main constitutions of the eccentric transmission wheel series (1000) are as follows:

In the treadle-drive eccentric wheel transmission wheel series with periodically varied speed ratio of the present invention, the bimodal elliptical passive wheel (213) can be composed of the same chain wheel or timing tooth-shaped pulley of which the round active wheel (113) is composed; the transmission belt (100) is a belt-shaped structure selected with respect to the wheel-shaped structures of the round active wheel (113) and the bimodal elliptical passive wheel (213) and the auxiliary wheel (312), which includes a chain, timing tooth-shaped belt, tooth-shaped belt, so as to be provided for the transmission operations between the round active wheel (113), the bimodal elliptical passive wheel (213) and the auxiliary wheel (312);

Transmission belt (100): a belt-shaped structure selected with respect to the wheel-shaped structures of the round active wheel (113) and the bimodal elliptical passive wheel (213) and an auxiliary wheel (312), which includes a chain, timing tooth-shaped belt or tooth-shaped chain, so as to be provided for the transmission operations between the round active wheel (113) and the bimodal elliptical passive wheel (213) and the auxiliary wheel (312);

Round active wheel (113): combined with the active wheel shaft (111), and the two sides of the active wheel shaft (111) are respectively combined with a first crank (101) and a second crank (201), wherein the first crank (101) is installed with a first treadle shaft (103) for being provided with a first treadle (102), and the second crank (201) is installed with a second treadle shaft (203) for being provided with a second treadle (202), and the round active wheel (113) is composed of a non-slidable chain wheel or timing tooth-shaped pulley;

Bimodal elliptical passive wheel (213): composed of a bimodal elliptical chain wheel or timing tooth-shaped pulley having the same circumference as the round active wheel (113), and installed on the passive wheel shaft (211), and the passive wheel is through the transmission belt (100) incorporating with the mentioned round active wheel (113) and the bimodal elliptical passive wheel (213) to be driven by the round active wheel (113), and through the auxiliary wheel (312) to perform prestressed tightening to the periodical tightening/releasing alternation of the driven transmission belt (100);

wherein the mechanical angle position between the bimodal of the bimodal elliptical passive wheel (213) and the passive wheel shaft (211), and the mechanical angle position between the round active wheel (113) and the first treadle shaft (103) and the second treadle shaft (203) and the active wheel shaft (111) form a certain mechanical angle differentiation relation;

The eccentric transmission wheel series (1000) of one or more than one step different speed ratio is constituted through the transmission engagement between the transmission belt (100), one or more than one round active wheel (113) and one or more than one bimodal elliptical passive wheel (213), as well as through the operation of the speed variable device;

Auxiliary wheel press helve (301): having one end coupled to a machine body (800) for swing motion through an auxiliary wheel press helve swing shaft (303), and the other end being installed with an auxiliary wheel shaft (311) for installing an auxiliary wheel (312), and an auxiliary wheel prestressed spring (302) is installed between the auxiliary wheel press helve (301) and the machine body (800) for generating an outward-expanding or inward-pressing prestressed pressure to the auxiliary wheel (312);

Auxiliary wheel (312): composed of the same chain wheel or timing tooth-shaped pulley of which the round active wheel (113) and the bimodal elliptical passive wheel (213) are composed, and provided for rotating on the auxiliary wheel shaft (311) and driven by the transmission belt (100), thereby through linked with the transmission belt (100) incorporating with the round active wheel (113) and the bimodal elliptical passive wheel (213), such as a chain or a timing tooth-shape pulley or a tooth-shaped chain, to utilize the prestressed pressure applied to the auxiliary wheel press helve (301) from the auxiliary wheel prestressed spring (302) to compel the auxiliary wheel shaft (311) and the auxiliary wheel (312), so as to tighten the transmission belt (100);

In the transmission wheel series composed of the round active wheel (113) serving as an active wheel, the bimodal elliptical passive wheel (213) serving as a passive wheel and the installation of the auxiliary wheel (312), when a human uprightly treadle to ride a bicycle, the right foot and the left foot follow a simple harmonic motion to form a sine wave treadle track with 180 degree differentiation, wherein the right foot treadles with respect to the up/down displacement track of the first treadle shaft (103), and the left foot treadles with respect to the up/down displacement track of the second treadle shaft (203), and during the continuous treadling of the right foot and the left foot, the speed ratio of the active wheel and the passive wheel of the treadle-drive elliptical transmission wheel series is defined through the relation of the mechanical angle position between the first treadle shaft (103) and the second treadle shaft (203) and the active wheel shaft (111), and through the transmission belt (100) the set mechanical angle position between the bimodal elliptical passive wheel (213) and the passive wheel shaft (211), thereby the round active wheel (113) periodically generates twice increase and decrease of the speed ratio to the bimodal elliptical passive wheel (213) during each treadle rotation; for example the mechanical angle differentiation relation of the mentioned round active wheel (113) and the first treadle shaft (103) and the second treadle shaft (203) is selected to be set as, when treadling along the treadle direction, the first treadle shaft (103) or the second treadle shaft (203) passing the upper stop and keeping to treadle along the treadle direction within a 180 degree range, thereby the round active wheel (113) to the bimodal elliptical passive wheel (213) is in a transmission varied speed ratio status of tending to the maximum speed accelerating ratio or the minimum speed decelerating ratio; the periodically varied speed ratio relation is upon the wheel shape of the eccentric transmission wheel series (1000), and one of the periodically varied speed ratio relation is shown in FIG. 2.

Figure 10:
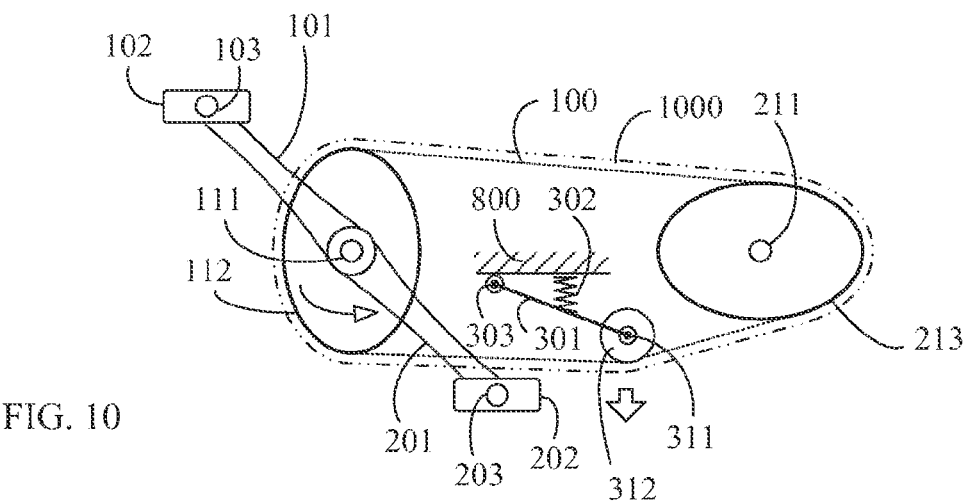
FIG. 10 is a schematic structural view showing the eccentric transmission wheel series (1000) of the present invention wherein the active wheel is a bimodal elliptical active wheel and the passive wheel is a bimodal elliptical passive wheel.

FIG. 10 is a schematic structural view showing the eccentric transmission wheel series (1000) of the present invention wherein the active wheel is a bimodal elliptical active wheel and the passive wheel is a bimodal elliptical passive wheel;

As shown in FIG. 10, the main constitutions of the eccentric transmission wheel series (1000) are as follows:

In the treadle-drive eccentric wheel transmission wheel series with periodically varied speed ratio of the present invention, the bimodal elliptical passive wheel (213) can be composed of the same elliptical chain wheel or timing tooth-shaped belt of which the bimodal elliptical active wheel (112) is composed; the transmission belt (100) is a belt-shaped structure selected with respect to the wheel-shaped structures of the bimodal elliptical active wheel (112) and the bimodal elliptical passive wheel (213) and the auxiliary wheel (312), which includes a chain, timing tooth-shaped belt, tooth-shaped belt, so as to be provided for the transmission operations between the bimodal elliptical active wheel (112), the bimodal elliptical passive wheel (213) and the auxiliary wheel (312);

Transmission belt (100): a belt-shaped structure selected with respect to the wheel-shaped structures of the bimodal elliptical active wheel (112) and the bimodal elliptical passive wheel (213) and an auxiliary wheel (312), which includes a chain, timing tooth-shaped belt or tooth-shaped chain, so as to be provided for the transmission operations between the bimodal active wheel (112) and the bimodal elliptical passive wheel (213) and the auxiliary wheel (312);

Bimodal elliptical active wheel (112): combined with the active wheel shaft (111), the two sides of the active wheel shaft (111) are respectively combined with a first crank (101) and a second crank (201), the first crank (101) is installed with a first treadle shaft (103) for being provided with a first treadle (102), the second crank (201) is installed with a second treadle shaft (203) for being provided with a second treadle (202), and the bimodal elliptical active wheel (112) is composed of a non-slidable chain wheel or timing tooth-shaped pulley, and wherein the mechanical angle position between the bimodal of the bimodal elliptic and the active wheel shaft (111) and the mechanical angle position between the first treadle shaft (103) and the second treadle shaft (203) and the active wheel shaft (111) form a certain mechanical angle differentiation relation;

Bimodal elliptical passive wheel (213): composed of the bimodal elliptical chain wheel or timing tooth-shaped pulley having the same shape and the same size as the bimodal elliptical active wheel (112), and is installed on the passive wheel shaft (211) and forms a 90 degree mechanical angle differentiation relative to the bimodal elliptical active wheel (112), and through the transmission belt (100) for transmission and connection, so as to be driven by the bimodal elliptical active wheel (211), and through the auxiliary wheel (312) to perform prestressed tightening to the tightening/releasing alternation of the driven transmission belt (100);

The eccentric transmission wheel series (1000) of one or more than one step different speed ratio is constituted through the transmission engagement between the transmission belt (100), one or more than one bimodal elliptical active wheel (112) and one or more than one bimodal elliptical passive wheel (213), as well as through the operation of the speed variable device;

Auxiliary wheel press helve (301): having one end coupled to a machine body (800) for swing motion through an auxiliary wheel press helve swing shaft (303), and the other end being installed with an auxiliary wheel shaft (311) for installing an auxiliary wheel (312), and an auxiliary wheel prestressed spring (302) is installed between the auxiliary wheel press helve (301) and the machine body (800) for generating an outward-expanding or inward-pressing prestressed pressure to the auxiliary wheel (312);

Auxiliary wheel (312): composed of the same chain wheel or timing tooth-shaped pulley of which the bimodal elliptical active wheel (112) and the bimodal elliptical passive wheel (213) are composed, and provided for rotating on the auxiliary wheel shaft (311) and driven by the transmission belt (100), thereby through linked with the transmission belt (100) incorporating with the bimodal elliptical active wheel (112) and the bimodal elliptical passive wheel (213), such as a chain or timing tooth-shape pulley or tooth-shaped chain, to use the prestressed pressure applied to the auxiliary wheel press helve (301) from the auxiliary wheel prestressed spring (302) to compel the auxiliary wheel shaft (311) and the auxiliary wheel (312), so as to tighten the transmission belt (100);

In the transmission wheel series composed of the bimodal elliptical active wheel (112) serving as an active wheel, the bimodal elliptical passive wheel (213) serving as a passive wheel and the installation of the auxiliary wheel (312), when a human uprightly treadle to ride a bicycle, the right foot and the left foot follow a simple harmonic motion to form a sine wave treadle track with 180 degree differentiation, wherein the right foot treadles with respect to the up/down displacement track of the first treadle shaft (103), and the left foot treadles with respect to the up/down displacement track of the second treadle shaft (203), and during the continuous treadling of the right foot and the left foot, the speed ratio of the active wheel and the passive wheel of the treadle-drive elliptical transmission wheel series is defined through the relation of the mechanical angle position between the bimodal elliptical active wheel (112) and the active wheel shaft (111), and the mechanical angle position between the first treadle shaft (103) and the second treadle shaft (203) and the active wheel shaft (111), and through the transmission belt (100) the set mechanical angle position between the bimodal elliptical passive wheel (213) and the passive wheel shaft (211), so the bimodal elliptical active wheel (112) periodically generates twice increase and decrease of the speed ratio to the bimodal elliptical passive wheel (213) during each treadle rotation; for example, the mechanical angle differentiation relation of the mentioned bimodal elliptical active wheel (112) and the first treadle shaft (103) and the second treadle shaft (203) is selected to be set as, when treadling along the treadle direction, the first treadle shaft (103) or the second treadle shaft (203) passing the upper stop and keeping to treadle along the treadle direction within a 90 degree range, thereby the bimodal elliptical active wheel (112) to the bimodal elliptical passive wheel (213) is in a transmission varied speed ratio status of tending to the maximum speed accelerating ratio or the minimum speed decelerating ratio; the periodically varied speed ratio relation is upon the wheel shape of the eccentric transmission wheel series (1000), and one of the periodically varied speed ratio relation is shown in FIG. 2.

Figure 11:
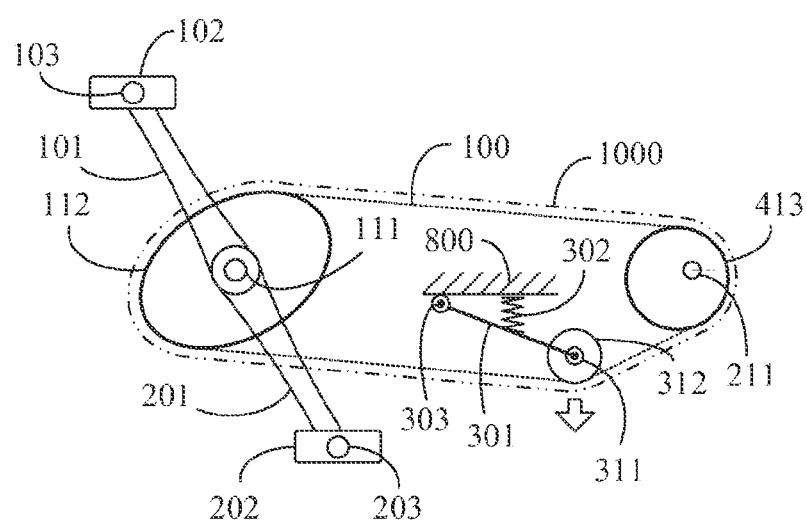
FIG. 11 is a schematic structural view showing the eccentric transmission wheel series (1000) of the present invention wherein the active wheel is a bimodal elliptical active wheel and the passive wheel is an eccentric transmission passive wheel.
Figure 12:
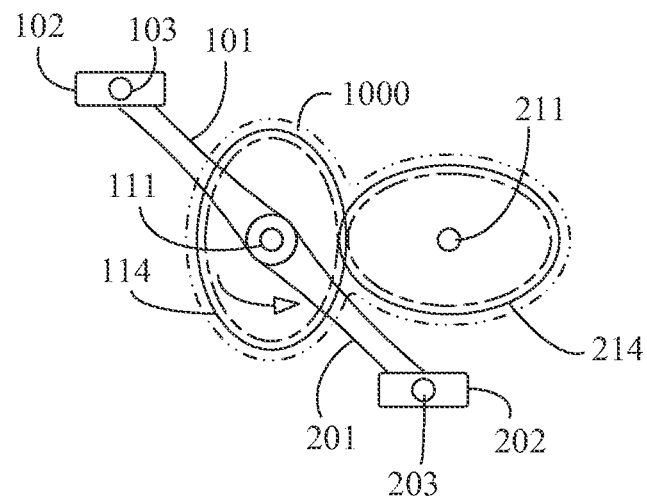
FIG. 12 is a schematic structural view showing the eccentric transmission wheel series (1000) of the present invention wherein the active wheel is a bimodal elliptical active gear and the passive wheel is also a bimodal elliptical passive gear.

FIG. 11 is a schematic structural view showing the eccentric transmission wheel series (1000) of the present invention wherein the active wheel is a bimodal elliptical active wheel and the passive wheel is an eccentric transmission passive wheel;

As shown in FIG. 11, the main constitutions of the eccentric transmission wheel series (1000) are as follows:

Transmission belt (100): a belt-shaped structure selected with respect to the wheel-shaped structures of the bimodal elliptical active wheel (112) and the eccentric passive wheel (413) and an auxiliary wheel (312), which includes a chain, timing tooth-shaped belt or tooth-shaped chain, so as to be provided for the transmission operations between the bimodal active wheel (112) and the eccentric passive wheel (413) and the auxiliary wheel (312);

Bimodal elliptical active wheel (112): combined with the active wheel shaft (111), the two sides of the active wheel shaft (111) are respectively combined with a first crank (101) and a second crank (201), the first crank (101) is installed with a first treadle shaft (103) for being provided with a first treadle (102), the second crank (201) is installed with a second treadle shaft (203) for being provided with a second treadle (202), and the bimodal elliptical active wheel (112) is composed of a non-slidable chain wheel or timing tooth-shaped pulley, and wherein the mechanical angle position between the bimodal of the bimodal elliptic and the active wheel shaft (111) and the mechanical angle position between the first treadle shaft (103) and the second treadle shaft (203) and the active wheel shaft (111) form a certain mechanical angle differentiation relation;

Eccentric passive wheel (413): composed of the same chain wheel, timing tooth-shaped pulley or gear of which the bimodal elliptical active wheel (112) is composed, and installed on the passive wheel shaft (211), and the pitch diameter thereof is half of that of the bimodal elliptical active wheel (112), and driven by the bimodal elliptical active wheel (112) through the transmission belt (100) which incorporates with the mentioned bimodal elliptical active wheel (112) and the eccentric passive wheel (413) and the auxiliary wheel (312), and provided for performing prestressed tightening to the periodical tightening/releasing alternation of the driven transmission belt through the auxiliary wheel (312), and the mechanical angle position of the eccentric upper protrusion directivity (c) of the eccentric passive wheel (413), and the mechanical angle position between the directivity (b) constituted by the first treadle shaft (103) and the second treadle shaft (203) and the active wheel shaft (111) through the transmission belt (100) form a certain mechanical angle differentiation relation;

The eccentric transmission wheel series (1000) of one or more than one step different speed ratio is constituted through the transmission engagement between the transmission belt (100), one or more than one bimodal elliptical active wheel (112) and one or more than one eccentric passive wheel (413), as well as through the operation of the speed variable device;

Auxiliary wheel press helve (301): having one end coupled to a machine body (800) for swing motion through an auxiliary wheel press helve swing shaft (303), and the other end being installed with an auxiliary wheel shaft (311) for installing an auxiliary wheel (312), and an auxiliary wheel prestressed spring (302) is installed between the auxiliary wheel press helve (301) and the machine body (800) for generating an outward-expanding or inward-pressing prestressed pressure to the auxiliary wheel (312);

Auxiliary wheel (312): composed of the same chain wheel or timing tooth-shaped pulley or gear of which the bimodal elliptical active wheel (112) and the eccentric passive wheel (413) are composed, and provided for rotating on the auxiliary wheel shaft (311) and driven by the transmission belt (100), thereby through linked with the transmission belt (100) incorporating with the bimodal elliptical active wheel (112) and the eccentric passive wheel (413), such as a chain or timing tooth-shape pulley or tooth-shaped chain, to utilize the prestressed pressure applied to the auxiliary wheel press helve (301) from the auxiliary wheel prestressed spring (302) to compel the auxiliary wheel shaft (311) and the auxiliary wheel (312), so as to tighten the transmission belt (100);

In the transmission wheel series composed of the bimodal elliptical active wheel (112) serving as an active wheel, the eccentric passive wheel (413) serving as a passive wheel and the installation of the auxiliary wheel (312), when a human uprightly treadle to ride a bicycle, the right foot and the left foot follow a simple harmonic motion to form a sine wave treadle track with 180 degree differentiation, wherein the right foot treadles with respect to the up/down displacement track of the first treadle shaft (103), and the left foot treadles with respect to the up/down displacement track of the second treadle shaft (203), and during the continuous treadling of the right foot and the left foot, the speed ratio of the active wheel and the passive wheel of the treadle-drive eccentric transmission wheel series (1000) is defined through the relation of the mechanical angle position of the eccentric upper protrusion directivity (c) of the eccentric passive wheel (413), and through the transmission belt (100) the mechanical angle position of the directivity (b) formed by the first treadle shaft (103) and the second treadle shaft (203) installed on the active wheel shaft (111), so the bimodal elliptical active wheel (112) periodically generates twice increase and decrease of the speed ratio to the eccentric passive wheel (413) during each treadle rotation; for example, the mechanical angle differentiation relation of the mentioned bimodal elliptical active wheel (112) and the first treadle shaft (103) and the second treadle shaft (203) is selected to be set as, when treadling along the treadle direction, the mechanical angle directivity (b) of the first treadle shaft (103) or the second treadle shaft (203) to the active wheel shaft (111) passing the upper stop directivity (a) and keeping to treadle along the treadle direction within a 180 degree range, thereby the bimodal elliptical active wheel (112) to the eccentric passive wheel (413) is in a transmission varied speed ratio status of tending to the maximum speed accelerating ratio or the minimum speed decelerating ratio; the periodically varied speed ratio relation is upon the wheel shape of the eccentric transmission wheel series (1000), and one of the periodically varied speed ratio relation is shown in FIG. 2;

FIG. 12 is a schematic structural view showing the eccentric transmission wheel series (1000) of the present invention wherein the active wheel is a bimodal elliptical active gear and the passive wheel is also a bimodal elliptical passive gear;

As shown in FIG. 12, the main constitutions of the eccentric transmission wheel series (1000) are as follows:

Bimodal elliptical active gear (114): combined with the active wheel shaft (111), the two sides of the active wheel shaft (111) are respectively combined with a first crank (101) and a second crank (201), the first crank (101) is installed with a first treadle shaft (103) for being provided with a first treadle (102), the second crank (201) is installed with a second treadle shaft (203) for being provided with a second treadle (202), the bimodal elliptical active gear (114) is composed of a gear, and wherein the mechanical angle position between the bimodal of the bimodal elliptic and the active wheel shaft (111) and the mechanical angle position between the first treadle shaft (103) and the second treadle shaft (203) and the active wheel shaft (111) form a certain mechanical angle differentiation relation;

Bimodal elliptical passive gear (214): constituted by a bimodal elliptical gear having the same shape and the same size as the bimodal elliptical active gear (114), and engaged with the bimodal elliptical active gear (114) at a 90 degree mechanical angle differentiation for being driven by the bimodal elliptical active gear (114);

The eccentric transmission wheel series (1000) of one or more than one step different speed ratio is constituted through the transmission engagement between the transmission belt (100), one or more than one bimodal elliptical active gear (114) and one or more than one bimodal elliptical passive gear (214), as well as through the operation of the speed variable device;

In the transmission wheel series composed of the bimodal elliptical active gear (114) serving as an active wheel, the bimodal elliptical passive gear (214) serving as a passive wheel and the above two components are engaged at a 90 degree mechanical angle differentiation, when a human uprightly treadle to ride a bicycle, the right foot and the left foot follow a simple harmonic motion to form a sine wave treadle track with 180 degree differentiation, wherein the right foot treadles with respect to the up/down displacement track of the first treadle shaft (103), and the left foot treadles with respect to the up/down displacement track of the second treadle shaft (203), and during the continuous treadling of the right foot and the left foot, the speed ratio of the active wheel and the passive wheel of the treadle-drive elliptical transmission wheel series is defined through the relation of the mechanical angle position between the bimodal elliptical active gear (114) and the active wheel shaft (111) and the mechanical angle position between the first treadle shaft (103) and the second treadle shaft (203) and the active wheel shaft (111), and according to the set relation of the mechanical angle differentiations, the bimodal elliptical active gear (114) periodically generates twice increase and decrease of the speed ratio to the bimodal elliptical passive gear (214) during each treadle rotation; for example, the mechanical angle differentiation relation of the mentioned bimodal elliptical active gear (114) and the first treadle shaft (103) and the second treadle shaft (203) is selected to be set as, when treadling along the treadle direction, the first treadle shaft (103) or the second treadle shaft (203) passing the upper stop and keeping to treadle along the treadle direction within a 180 degree range, thereby the bimodal elliptical active gear (114) to the bimodal elliptical passive gear (214) is in a transmission varied speed ratio status of tending to the maximum speed accelerating ratio or the minimum speed decelerating ratio; the periodically varied speed ratio relation is upon the wheel shape of the eccentric transmission wheel series (1000), and one of the periodically varied speed ratio relation is shown in FIG. 2.

Figure 13:
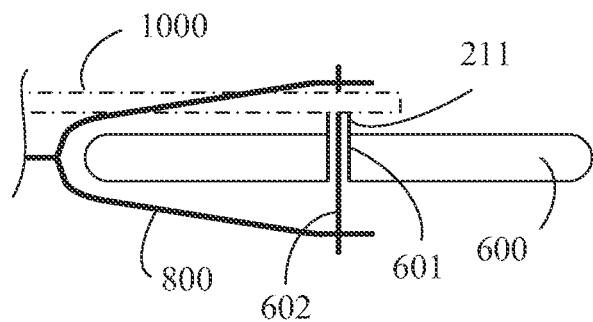
FIG. 13 is a schematic structural view showing the passive wheel shaft (211) of the eccentric transmission wheel series (1000) shown in FIG. 3~FIG. 12 directly drives the load wheel set (600), according to the present invention.

In the treadle-drive eccentric wheel transmission wheel series with periodically varied speed ratio of the present invention, the transmission means between the passive wheel shaft (211) and the load wheel set (600) include:

1. The load wheel set (600) is directly driven by the passive wheel shaft (211) of the eccentric transmission wheel series (1000); or
2. The load wheel set (600) is driven by the passive wheel shaft (211) of the eccentric transmission wheel series (1000) through the middle transmission (5000); or
3. The load wheel set (600) is driven by the passive wheel shaft (211) of the eccentric transmission wheel series (1000) through the step or continuous inner variable speed device (2000); or
4. The load wheel set (600) is driven by the passive wheel shaft (211) of the eccentric transmission wheel series (1000) through the middle transmission (5000) and the step or continuous inner variable speed device (2000); or
5. The load wheel set (600) is driven by the passive wheel shaft (211) of the eccentric transmission wheel series (1000) through step or continuous outer variable speed device (3000);

FIG. 13 is a schematic structural view showing the passive wheel shaft (211) of the eccentric transmission wheel series (1000) shown in FIG. 3~FIG. 12 directly drives the load wheel set (600), according to the present invention;

As shown in FIG. 13, the main constitutions of the eccentric transmission wheel series (1000) are as follows:

Eccentric transmission wheel series (1000): the active wheels or the passive wheels to constitute the eccentric wheel series include the round eccentric wheel, non-round eccentric wheel, bimodal elliptical wheel and round wheel to constitute one or both of the active wheels and the passive wheels, so as to incorporate with timing pulleys and transmission belt, or chain wheels and the transmission chain, or directly constituted by the gear set with the function of periodically varied speed ratio;

Passive wheel shaft (211): related to a hollow or solid rotatable shaft structure combined to the output end of the passive wheel of the eccentric transmission wheel series (1000) for driving the sleeve (601);

Sleeve (601): related to a hollow rotating shaft structure for sleeve to the core axis (602), and driven by the passive wheel shaft (211) to drive the load wheel set (600);

Load wheel set (600): related to a rotatable wheel set structure, and rotated on the core axis (602) through the sleeve (601), and thereby driven by the passive wheel shaft (211).

Figure 14:
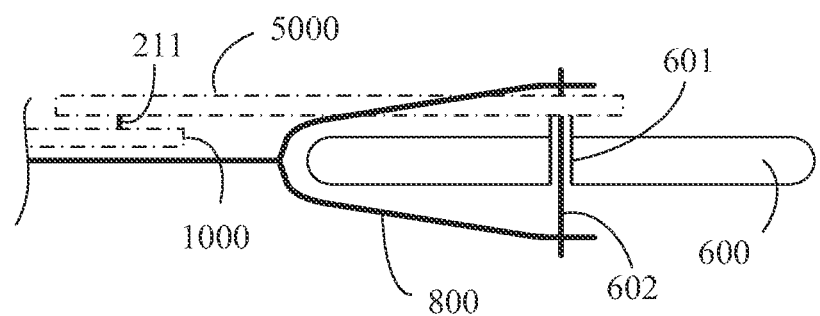
FIG. 14 is a schematic structural view showing the passive wheel shaft (211) of the eccentric transmission wheel series (1000) shown in FIG. 3~FIG. 12 drives the load wheel set (600) through the middle transmission, according to the present invention.

FIG. 14 is a schematic structural view showing the passive wheel shaft (211) of the eccentric transmission wheel series (1000) shown in FIG. 3~FIG. 12 drives the load wheel set (600) through the middle transmission, according to the present invention;

As shown in FIG. 14, the main constitutions of the eccentric transmission wheel series (1000) are as follows:

Eccentric transmission wheel series (1000): the active wheels or the passive wheels to constitute the eccentric wheel series include the round eccentric wheel, non-round eccentric wheel, bimodal elliptical wheel and round wheel to constitute one or both of the active wheels and the passive wheels, so as to incorporate with timing pulleys and transmission belt, or chain wheels and the transmission chain, or directly constituted by the gear set with the function of periodically varied speed ratio;

Passive wheel shaft (211): related to a hollow or solid rotatable shaft structure combined to the output end of the passive wheel of the eccentric transmission wheel series (1000) for driving the primary drive wheel on the input end of the middle transmission (5000);

middle transmission (5000): constituted by the transmission belt and pulley wheel train, or the transmission chain and chain wheel train, or the gear set, or the driving rod and the bevel gear set, wherein the input end thereof is subject to be driven by the passive wheel shaft (211) and the output end thereof is served to drive the sleeve (601);

Sleeve (601): related to a hollow rotating shaft structure for sleeve to the core axis (602), and driven by the output end of the passive wheel of the middle transmission (5000);

Load wheel set (600): related to a rotatable wheel set structure, and rotated on the core axis (602) through the sleeve (601), and thereby driven by the output end of the passive wheel of the middle transmission (5000) from the sleeve (601).

Figure 15:
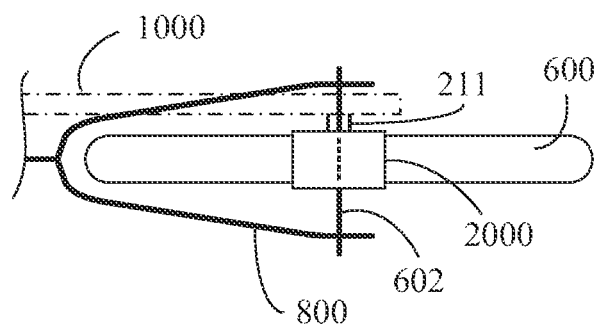
FIG. 15 is a schematic structural view showing the passive wheel shaft (211) of the eccentric transmission wheel series (1000) shown in FIG. 3~FIG. 12 drives the load wheel set (600) through the step or continuous inner variable speed device (2000), according to the present invention.

FIG. 15 is a schematic structural view showing the passive wheel shaft (211) of the eccentric transmission wheel series (1000) shown in FIG. 3~FIG. 12 drives the load wheel set (600) through the step or continuous inner variable speed device (2000), according to the present invention;

As shown in FIG. 15, the main constitutions of the eccentric transmission wheel series (1000) are as follows:

Eccentric transmission wheel series (1000): the active wheels or the passive wheels to constitute the eccentric wheel series include the round eccentric wheel, non-round eccentric wheel, bimodal elliptical wheel and round wheel to constitute one or both of the active wheels and the passive wheels, so as to incorporate with timing pulleys and transmission belt, or chain wheels and the transmission chain, or directly constituted by the gear set with the function of periodically varied speed ratio;

Passive wheel shaft (211): related to a hollow or solid rotatable shaft structure combined to the output end of the passive wheel of the eccentric transmission wheel series (1000) for driving the input end of the inner variable speed device (2000);

Inner variable speed device (2000): related to the step or continuous inner variable speed device with two or more than steps subject to the external operations, which is constituted by the gear or the friction wheel and the speed switch mechanism, and the input end thereof is driven by the passive wheel shaft (211) and the output end thereof is served to drive the load wheel set (600);

Load wheel set (600): related to a rotatable wheel set structure for being driven by the output end of the inner variable speed device (2000).

Figure 16:
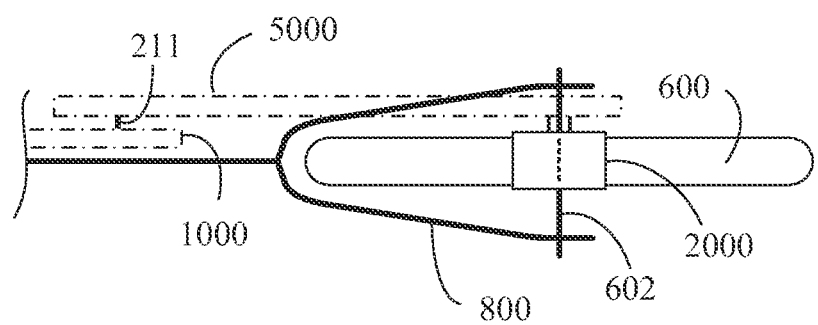
FIG. 16 is a schematic structural view showing the passive wheel shaft (211) of the eccentric transmission wheel series (1000) shown in FIG. 3~FIG. 12 drives the load wheel set (600) through the middle transmission (5000) and the step or continuous inner variable speed device (2000), according to the present invention.

FIG. 16 is a schematic structural view showing the passive wheel shaft (211) of the eccentric transmission wheel series (1000) shown in FIG. 3~FIG. 12 drives the load wheel set (600) through the middle transmission (5000) and the step or continuous inner variable speed device (2000), according to the present invention;

As shown in FIG. 16, the main constitutions of the eccentric transmission wheel series (1000) are as follows:

Eccentric transmission wheel series (1000): the active wheels or the passive wheels to constitute the eccentric wheel series include the round eccentric wheel, non-round eccentric wheel, bimodal elliptical wheel and round wheel to constitute one or both of the active wheels and the passive wheels, so as to incorporate with timing pulleys and transmission belt, or chain wheels and the transmission chain, or directly constituted by the gear set with the function of periodically varied speed ratio;

Passive wheel shaft (211): related to a hollow or solid rotatable shaft structure combined to the output end of the passive wheel of the eccentric transmission wheel series (1000) for driving the primary drive wheel on the input end of the middle transmission (5000);

middle transmission (5000): constituted by the transmission belt and pulley wheel train, or the transmission chain and chain wheel train, or the gear set, or the driving rod and the bevel gear set, wherein the input end thereof is driven by the passive wheel shaft (211) and the output end thereof is served to drive the input end of the inner variable speed device (2000);

Inner variable speed device (2000): related to the step or continuous inner variable speed device with two or more than steps subject to the external operations, which is constituted by the gear or the friction wheel and the speed switch mechanism, and the input end thereof is driven by the output end of the middle transmission (5000) and the output end thereof is served to drive the load wheel set (600);

Load wheel set (600): related to a rotatable wheel set structure for being driven by the output end of the inner variable speed device (2000).

Figure 17:
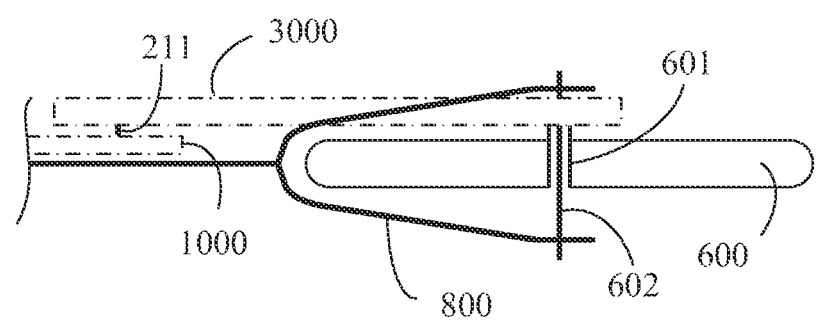
FIG. 17 is a schematic structural view showing the passive wheel shaft (211) of the eccentric transmission wheel series (1000) shown in FIG. 3~FIG. 12 drives the load wheel set (600) through the step or continuous outer variable speed device (3000), according to the present invention.

FIG. 17 is a schematic structural view showing the passive wheel shaft (211) of the eccentric transmission wheel series (1000) shown in FIG. 3~FIG. 12 drives the load wheel set (600) through the step or continuous outer variable speed device (3000), according to the present invention;

As shown in FIG. 17, the main constitutions of the eccentric transmission wheel series (1000) are as follows:

Eccentric transmission wheel series (1000): the active wheels or the passive wheels to constitute the eccentric wheel series include the round eccentric wheel, non-round eccentric wheel, bimodal elliptical wheel and round wheel to constitute one or both of the active wheels and the passive wheels, so as to incorporate with timing pulleys and transmission belt, or chain wheels and the transmission chain, or directly constituted by the gear set with the function of periodically varied speed ratio;

Passive wheel shaft (211): related to a hollow or solid rotatable shaft structure combined to the output end of the passive wheel of the eccentric transmission wheel series (1000) for driving the primary drive wheel of the input end of the outer variable speed device (3000);

Outer variable speed device (3000): related to the step or continuous inner variable speed device with two or more than steps subject to the external operations, which is constituted by the chains and the chain wheel set, or the pulley or the pulley wheel set, or the gear the speed switch mechanism or clutch, and the input end thereof is driven by the passive wheel shaft (211) and the output end thereof is served to drive the load wheel set (600) through the sleeve (601);

Sleeve (601): related to a hollow rotating shaft structure for sleeve to the core axis (602), and driven by the output end of the passive wheel of the outer variable speed device (3000);

Load wheel set (600): related to a rotatable wheel set structure, and rotated on the core axis (602) through the sleeve (601), and thereby driven by the output end of the passive wheel of the outer variable speed device (3000) from the sleeve (601). The above mentioned periodically varied speed ratio wheel series in the treadle-drive eccentric wheel transmission wheel series with periodically varied speed ratio of the present invention can be constituted by one or more than one set of the eccentric transmission wheel series (1000) with different speed ratio in parallel connection, or can be switched between the active wheel and the passive wheel in turn to obtain multi-step speed ratios.

The invention claimed is:

1. A treadle-drive transmission wheel series with a periodically varied speed ratio, comprising:

a transmission belt (100);

a bimodal elliptical active wheel (112) combined with an active wheel shaft (111) extending from two sides of the bimodal elliptical active wheel (112), wherein:
the active wheel shaft (111) is combined on a first side of the bimodal elliptical active wheel (112) with a first crank (101) and on a second side of the bimodal elliptical active wheel (112) with a second crank (201),
the first crank (101) includes a first treadle (102) mounted on a first treadle shaft (103), and
the second crank (201) includes a second treadle (202) mounted on a second treadle shaft (203);
an eccentric passive wheel (413), the eccentric passive wheel (413) being mounted on a passive wheel shaft (211) and coupled to the bimodal elliptical active wheel (112) by the transmission belt (100), the transmission belt (100) transmitting rotational motion from the bimodal elliptical active wheel (112) to the eccentric passive wheel (413), wherein:
said eccentric passive wheel (413) has a circumference that is one half a circumference of the bimodal elliptical active wheel (112) such that a single rotation of the bimodal elliptical active wheel (112) results in two rotations of the eccentric passive wheel (413); and
an auxiliary wheel (312) mounted on a swinging support (301) pivotally coupled to a machine body (800) and biased by a spring (302) installed between the swinging support (301) and the machine body (800) to press against the transmission belt (100) and maintain engagement between the transmission belt (100), the bimodal elliptical active wheel (112), and the eccentric passive wheel (413),
wherein an angular relationship between the bimodal elliptical active wheel (112) and the eccentric passive wheel (413) causes a speed ratio between the bimodal elliptical active wheel (112) and the eccentric passive wheel (413) to increase and decrease twice during a complete rotation of the bimodal elliptical active wheel (112) in response to up and down movement by a user of the first and second treadles (102,202) such that the speed ratio decreases as a respective treadle approaches a top position and increases during initial downward movement of the respective treadle from the top position, and
wherein the transmission belt (100) is a toothed belt or chain that engages corresponding structures on the bimodal elliptical active wheel (112), the eccentric passive wheel (413), and the auxiliary wheel (312) to prevent sliding between the transmission (100) and the respective wheels (112,413,312).

2. A treadle-drive transmission wheel series with a periodically varied speed ratio as claimed in claim 1, wherein said bimodal elliptical active wheel (112), said transmission belt (100), and said eccentric passive wheel (413) form a transmission wheel series (1000), said passive wheel shaft (211) is fixed to a sleeve (601) of a load wheel (600) to cause rotation of the load wheel (600), and said sleeve (601) is rotatably mounted on an axle (602) that extends through said sleeve (601) and is fixed to said machine body (800).

3. A treadle-drive transmission wheel series with a periodically varied speed ratio as claimed in claim 1, wherein said bimodal elliptical active wheel (112), said transmission belt (100), and said eccentric passive wheel (413) form a first transmission wheel series (1000), said passive wheel shaft (211) is further combined with a middle transmission (5000) that is coupled to and drives a sleeve (601) of a load wheel (600) to cause rotation of the load wheel (600), and said sleeve (601) is rotatably mounted on an axle (602) that extends through said sleeve (601) and is fixed to said machine body (800).

4. A treadle-drive transmission wheel series with a periodically varied speed ratio as claimed in claim 1, wherein said transmission belt (100), said bimodal elliptical active wheel (112), and said eccentric passive wheel (413) form a transmission wheel series (1000), said passive wheel shaft (211) is coupled to an internal variable speed device (2000) of a load wheel (600) to cause rotation of the load wheel (600), and said internal variable speed device (2000) is rotatably mounted on an axle (602) that extends through said internal variable speed device (2000) and is fixed to said machine body (800).

5. A treadle-drive transmission wheel series with a periodically varied speed ratio as claimed in claim 1, wherein said transmission belt (100), said bimodal elliptical active wheel (112), and said eccentric passive wheel (413) form a transmission wheel series (1000), said passive wheel shaft (211) is further combined with a middle transmission (5000) that is coupled to and drives an internal variable speed device (2000) of a load wheel (600) to cause rotation of the load wheel (600), and said internal variable speed device (2000) is rotatably mounted on an axle (602) that extends through said internal variable speed device (2000) and is fixed to said machine body (800).

6. A treadle-drive transmission wheel series with a periodically varied speed ratio as claimed in claim 1, wherein said bimodal elliptical active wheel (112), said transmission belt (100), and said eccentric passive wheel (413) form a first transmission wheel series (1000), said passive wheel shaft (211) is further combined with an external variable speed device (3000) that is coupled to and drives a sleeve (601) of a load wheel (600) to cause rotation of the load wheel (600), and said sleeve (601) is rotatably mounted on an axle (602) that extends through said sleeve (601) and is fixed to said machine body (800).

7. A treadle-drive transmission wheel series with a periodically varied speed ratio as claimed in claim 1, wherein values of the increasing and decreasing speed ratio between the bimodal elliptical active wheel (112) and the eccentric passive wheel (413) are determined by a shape of the bimodal elliptical active wheel (112) and by an offset and angle of a shaft (211) of the eccentric passive wheel (413) relative to a center of the eccentric passive wheel (413).

* * * * *